(12) United States Patent
Hayashi et al.

(10) Patent No.: US 9,547,450 B2
(45) Date of Patent: *Jan. 17, 2017

(54) METHOD AND APPARATUS TO CHANGE TIERS

(71) Applicant: HITACHI, LTD., Chiyoda-ku (JP)

(72) Inventors: Shinichi Hayashi, Santa Clara, CA (US); Tomohiro Kawaguchi, Santa Clara, CA (US)

(73) Assignee: HITACHI, LTD., Chiyoda-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/942,555

(22) Filed: Nov. 16, 2015

(65) Prior Publication Data
US 2016/0070497 A1    Mar. 10, 2016

Related U.S. Application Data

(63) Continuation of application No. 13/277,134, filed on Oct. 19, 2011, now Pat. No. 9,218,131.

(51) Int. Cl.
*G06F 3/06* (2006.01)

(52) U.S. Cl.
CPC ............ *G06F 3/0619* (2013.01); *G06F 3/061* (2013.01); *G06F 3/067* (2013.01); *G06F 3/0608* (2013.01); *G06F 3/0631* (2013.01); *G06F 3/0647* (2013.01); *G06F 3/0649* (2013.01); *G06F 3/0665* (2013.01); *G06F 3/0685* (2013.01); *G06F 3/0689* (2013.01)

(58) Field of Classification Search
CPC .... G06F 3/0619; G06F 3/0631; G06F 3/0665; G06F 3/0689

USPC ......................................................... 709/213
See application file for complete search history.

(56) References Cited

U.S. PATENT DOCUMENTS

| 8,359,444 B2 | 1/2013 | Arakawa |
| 8,495,318 B2 * | 7/2013 | Tremaine ............ G06F 12/1009 711/100 |
| 8,566,550 B2 | 10/2013 | Kawaguchi et al. |

(Continued)

FOREIGN PATENT DOCUMENTS

| CN | 102023813 | 11/2001 |
| JP | 2006-079274 | 3/2006 |

(Continued)

OTHER PUBLICATIONS

M. Evans, Working Draft Project American National Standard T10/1799-D, Information Technology—SCSI Block Commands—3 (SBC-3), Oct. 4, 2011, pp. 1-262, Revision 29, T10/1799 Technical Committee on SCSI Storage Interfaces, American National Standards Institute (ANSI).

(Continued)

*Primary Examiner* — Kevin Bates
*Assistant Examiner* — Nazia Naoreen
(74) *Attorney, Agent, or Firm* — Procopio, Cory, Hargreaves & Savitch LLP

(57) ABSTRACT

Systems and methods directed to changing tiers for a storage area that utilizes thin provisioning. Systems and methods check the area subject to a tier change command and change the tier based on the tier specified in the tier change command, and the tier presently associated with the targeted storage area. The pages of the systems and methods may be further restricted to one file per page.

15 Claims, 25 Drawing Sheets

(56) References Cited

U.S. PATENT DOCUMENTS

| | | | |
|---|---|---|---|
| 8,688,941 B2 | 4/2014 | Arakawa | |
| 8,694,727 B2* | 4/2014 | Naganuma | G06F 3/061 |
| | | | 711/114 |
| 2007/0055713 A1 | 3/2007 | Nagai et al. | |
| 2007/0233987 A1 | 10/2007 | Maruyama | |
| 2010/0077168 A1 | 3/2010 | Arakawa | |
| 2011/0197024 A1* | 8/2011 | Thomas | G06F 11/2094 |
| | | | 711/114 |
| 2011/0202705 A1 | 8/2011 | Hayashi et al. | |
| 2011/0289287 A1* | 11/2011 | Yamamoto | G06F 3/0605 |
| | | | 711/156 |
| 2012/0011329 A1* | 1/2012 | Nonaka | G06F 3/0604 |
| | | | 711/154 |
| 2012/0030179 A1* | 2/2012 | Kauffman | G06F 17/30091 |
| | | | 707/654 |

FOREIGN PATENT DOCUMENTS

| | | |
|---|---|---|
| JP | 2007-279845 | 10/2007 |
| JP | 2011-170833 | 9/2011 |
| WO | 2011/114382 | 9/2011 |

OTHER PUBLICATIONS

Office Action dated Mar. 2, 2015 for Chinese Patent App. No. 2012101876451.
Office Action of Japanese Application No. 2012-076892 dated Oct. 6, 2015.
Office Action dated May 6, 2016 for JP App No. 2012-076892.

* cited by examiner

| FILE LOCATION INFORMATION | | | |
|---|---|---|---|
| FILE NAME ~601 | FILE ADDRESS ~602 | VOLUME NAME ~603 | VOLUME ADDRESS ~604 |
| FILE A | 0 - 15 | V-VOL A | 0 - 15 |
| FILE B | 16 - 31 | V-VOL A | 16 - 31 |
| FILE C | 32 - 47 | V-VOL A | 32 - 47 |

FILE TIER POLICY INFORMATION 405

| FILE NAME 701 | TIER 702 |
|---|---|
| FILE A | TIER 1 703 |
| FILE B | TIER 2 704 |
| FILE C | TIER 3 705 |

| VOLUME NAME 711 | PRIORITY 712 |
|---|---|
| VOLUME A | HIGHER TIER 713 |
| VOLUME B | LOWER TIER 714 |

Fig. 7

RAID GROUP INFORMATION 502

| RAID GROUP NAME 801 | MEDIA NAME 802 | RAID LEVEL 803 | MEDIA TYPE 804 | CAPACITY 805 |
|---|---|---|---|---|
| RG A | SSD A, SSD B, SSD C | RAID 5 | SSD SLC | 100 |
| RG B | HDD A, HDD B, HDD C | RAID 5 | HDD SAS 15,000 rpm | 100 |
| RG C | HDD D, HDD E, HDD F | RAID 5 | HDD SATA 72,00 rpm | 100 |

Fig. 8

| LOGICAL VOLUME INFORMATION | | | |
|---|---|---|---|
| LOGICAL VOLUME NAME ~901 | LOGICAL VOLUME ADDRESS ~902 | RAID GROUP NAME ~903 | RAID GROUP ADDRESS ~904 |
| L-VOL A | 0 - 99 | RG A | 0 - 99 |
| L-VOL B | 0 - 99 | RG B | 0 - 99 |
| L-VOL C | 0 - 99 | RG C | 0 - 99 |

Fig. 9

POOL INFORMATION

| POOL NAME ~1001 | LOGICAL VOLUME NAME ~1002 | VIRTUAL VOLUME NAME ~1003 | CAPACITY ~1004 |
|---|---|---|---|
| POOL A | L-VOL A, L-VOL B, L-VOL C | V-VOL A | 300 |
| POOL B | L-VOL D, L-VOL E | V-VOL B | 300 |

VIRTUAL VOLUME INFORMATION

| VIRTUAL VOLUME PAGE NUMBER 1101 | VIRTUAL VOLUME NAME 1102 | VIRTUAL VOLUME ADDRESS 1103 | LOGICAL VOLUME PAGE NUMBER 1104 | LOGICAL VOLUME NAME 1105 | LOGICAL VOLUME ADDRESS 1106 |
|---|---|---|---|---|---|
| PAGE 0 | V-VOL A | 0 - 9 | PAGE 100 | L-VOL A | 0 - 9 |
| PAGE 1 | V-VOL A | 10 - 19 | PAGE 101 | L-VOL A | 10 - 19 |
| PAGE 2 | V-VOL A | 20 - 29 | PAGE 200 | L-VOL B | 0 - 9 |
| PAGE 3 | V-VOL A | 30 - 39 | PAGE 201 | L-VOL B | 10 - 19 |
| PAGE 4 | V-VOL A | 40 - 49 | PAGE 300 | L-VOL C | 0 - 9 |

Fig. 11

| TIER DEFINITION INFORMATION | | |
|---|---|---|
| TIER | MEDIA TYPE | DEFAULT TIER |
| 1 | SSD SLC | |
| 2 | HDD SAS 15,000 rpm | X |
| 3 | HDD SATA 72,00 rpm | |

Fig. 12

| FILE WRITE COMMAND | | | |
|---|---|---|---|
| COMMAND TYPE | FILE NAME | FILE ADDRESS | DATA |
| WRITE | FILE A | 0 - 3 | ABCD |

| REPLY TYPE | VOLUME NAME | VOLUME ADDRESS | ALLOCATED TIER | PAGE SIZE | NUMBER OF TIERS |
|---|---|---|---|---|---|
| GET STATUS | V-VOL A | 5 - 9 | 1 | 10 | 3 |
| | | 10 - 19 | 1 | | |
| | | 20 - 24 | 2 | | |

GET STATUS COMMAND REPLY 2201, 2202, 2203, 2204, 2205, 2206

Fig. 22

METHOD AND APPARATUS TO CHANGE TIERS

BACKGROUND

Field

Aspects of exemplary embodiments relate generally to thin provisioning and tier management in a data storage environment and, more particularly, to methods and apparatuses to allocate pages in a thin provisioning system.

Related Art

Thin provisioning is a method for allocating an area of a storage subsystem that receives a write command to an unallocated area in a virtual volume. A page is a unit of an allocated area. A command can be used to obtain a status of the virtual volume and the page size. Informed of such status, an application can determine whether some area is allocated. A storage subsystem can allocate several types of media to an unallocated area in the virtual volume.

FIG. 1 and FIG. 2 are exemplary diagrams illustrating relationships among files, virtual volumes, and logical volumes for an application program capable of changing tier for an area. A file A is mapped to page 0 and page 1. Page 0 of the virtual volume is mapped to page 100 of the logical volume. Page 100 and page 101 of the logical volume are tier 1, and page 200 and page 201 of the logical volume are tier 2. The file tier policy information 405 shows a file specified by the file name 701 that should be stored in an area with a tier specified by the tier 702. The application program changes tiers based on the file tier policy information 405, which is a table that relates the file name and the tier. Therefore, page 0 and page 1 of the logical volume are mapped to tier 1 of the logical volume in FIG. 1.

As shown in FIG. 2, because the application program changes the tiers of file B to tier 2, the page 1 and the page 2 are mapped to tier 2, and a part of file A is stored in tier 2. Because tier 2 is a lower performance media than tier 1, the performance of file A decreases, which may be detrimental if file A was placed in a tier 1 for performance reasons.

SUMMARY

Aspects of the exemplary embodiments include a system, involving a storage subsystem; and a storage subsystem receiving a command for changing a tier of a specified storage area in the storage subsystem to a different specified tier, checking the specified storage area for a page including a file assigned to a different tier than the specified tier, and determining whether to execute the command or not based on a result of the checking.

Additional aspects of the exemplary embodiments further include a computer readable medium storing instructions to be executed by a central processing unit (CPU), which involves receiving a command for changing a tier of a specified storage area in the storage subsystem to a different specified tier; checking the specified storage area for a page including a file assigned to a different tier than the specified tier; and determining whether to execute the command or not based on a result of the checking.

Additional aspects of the exemplary embodiments further include a system, involve a storage subsystem; and a storage subsystem, wherein when the storage subsystem receives a status inquiry command for a location in the storage subsystem from the application server, the storage subsystem transmits to the application server allocated tier information corresponding to the location.

Additional aspects of the exemplary embodiments furthers include a system, involve an application server issuing a tier change command to a storage system, wherein the command comprises specified tier information and a storage location of a file to be moved to a storage area in the storage system with a qualifying tier.

BRIEF DESCRIPTION OF DRAWINGS

These, and or/other aspects will become more readily appreciated from the following description of the embodiments, taken in conjunction with the accompanying drawings, in which:

FIG. 6 illustrates the file location information in accordance with an exemplary embodiment;

FIG. 7 illustrates the file tier policy information in accordance with an exemplary embodiment;

FIG. 8 illustrates the RAID group information in accordance with an exemplary embodiment;

FIG. 9 illustrates the logical volume information in the form of a table in accordance with an exemplary embodiment;

FIG. 10 illustrates the pool information in the form of a table, in accordance with an exemplary embodiment;

FIG. 11 illustrates the virtual volume information in the form of a table in accordance with an exemplary embodiment;

FIG. 12 illustrates the tier definition information in the form of a table in accordance with an exemplary embodiment;

FIG. 14 illustrates a file write command in accordance with an exemplary embodiment;

FIG. 22 illustrates a get status command reply in accordance with the second exemplary implementation.

DETAILED DESCRIPTION

Because present thin provisioning methods have multiple files located in each page, the present thin provisioning methods do not have any application programs to change the tier of an area in the system. There is also no method for the application program to know the boundaries of the pages. The exemplary embodiments are generally directed to providing systems and methods to allow storage areas to change tiers in storage systems employing thin provisioning. In the exemplary embodiments, the storage subsystem changes the tier of an area based on a command from the application program.

In one exemplary implementation, the application program gets the page size from storage subsystem. The pages of the storage subsystem are restricted to containing only one file per page. The application server thereby locates only one file and its corresponding page based on the page size and sends a command to change tiers.

Figure 1:
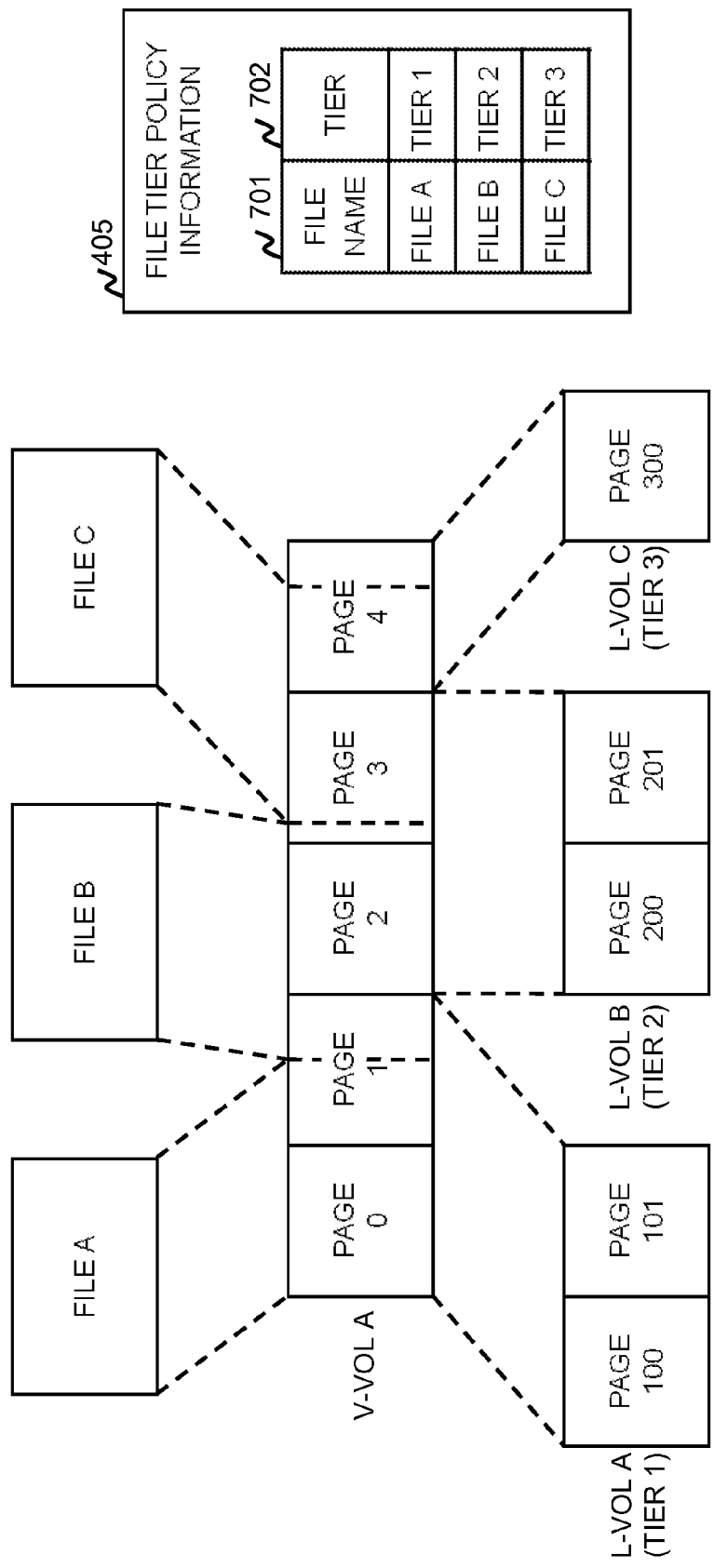
FIG. 1 illustrates an exemplary diagram illustrating relationships between files, virtual volumes and logical volumes for a thin provisioning system.
Figure 2:
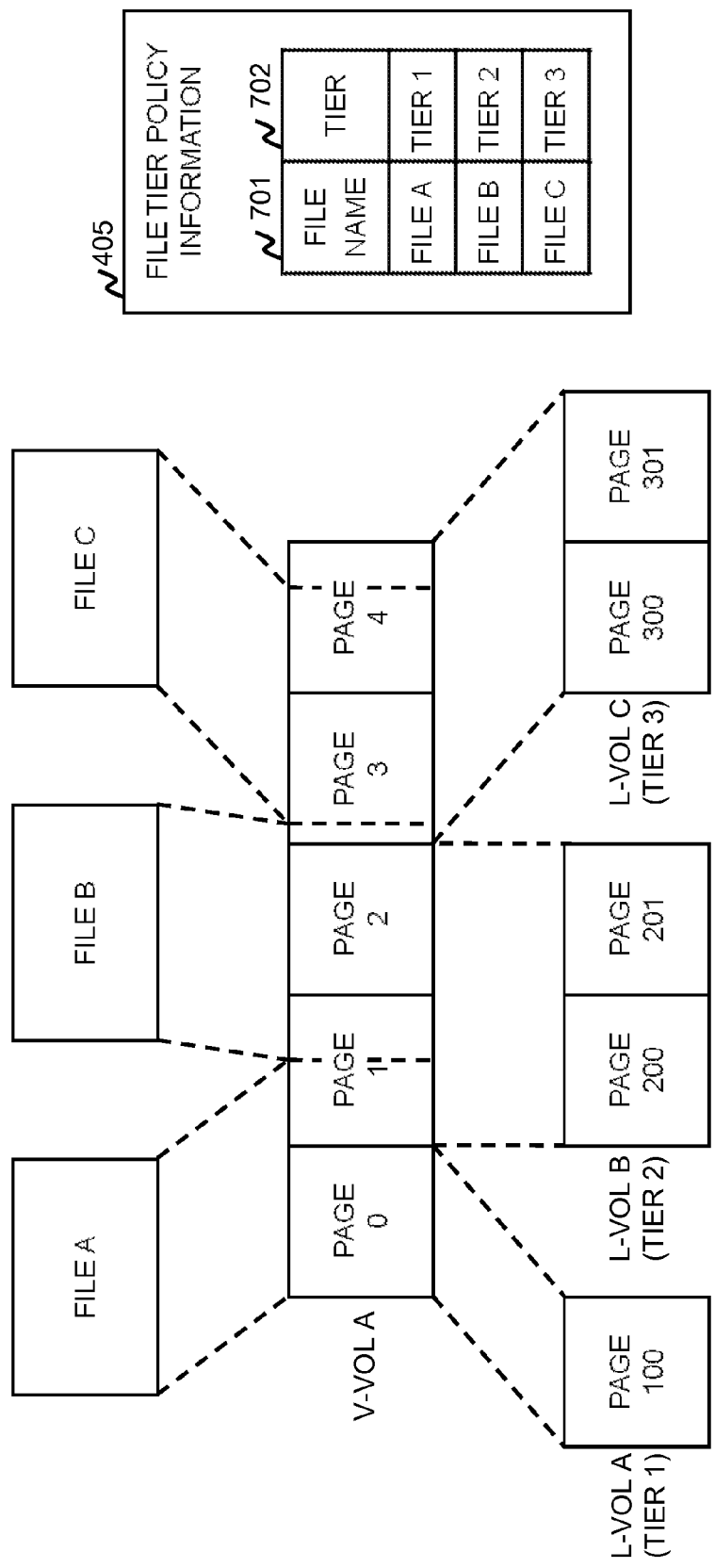
FIG. 2 illustrates another exemplary diagram illustrating relationships between files, virtual volumes and logical volumes for a thin provisioning system.
Figure 3:
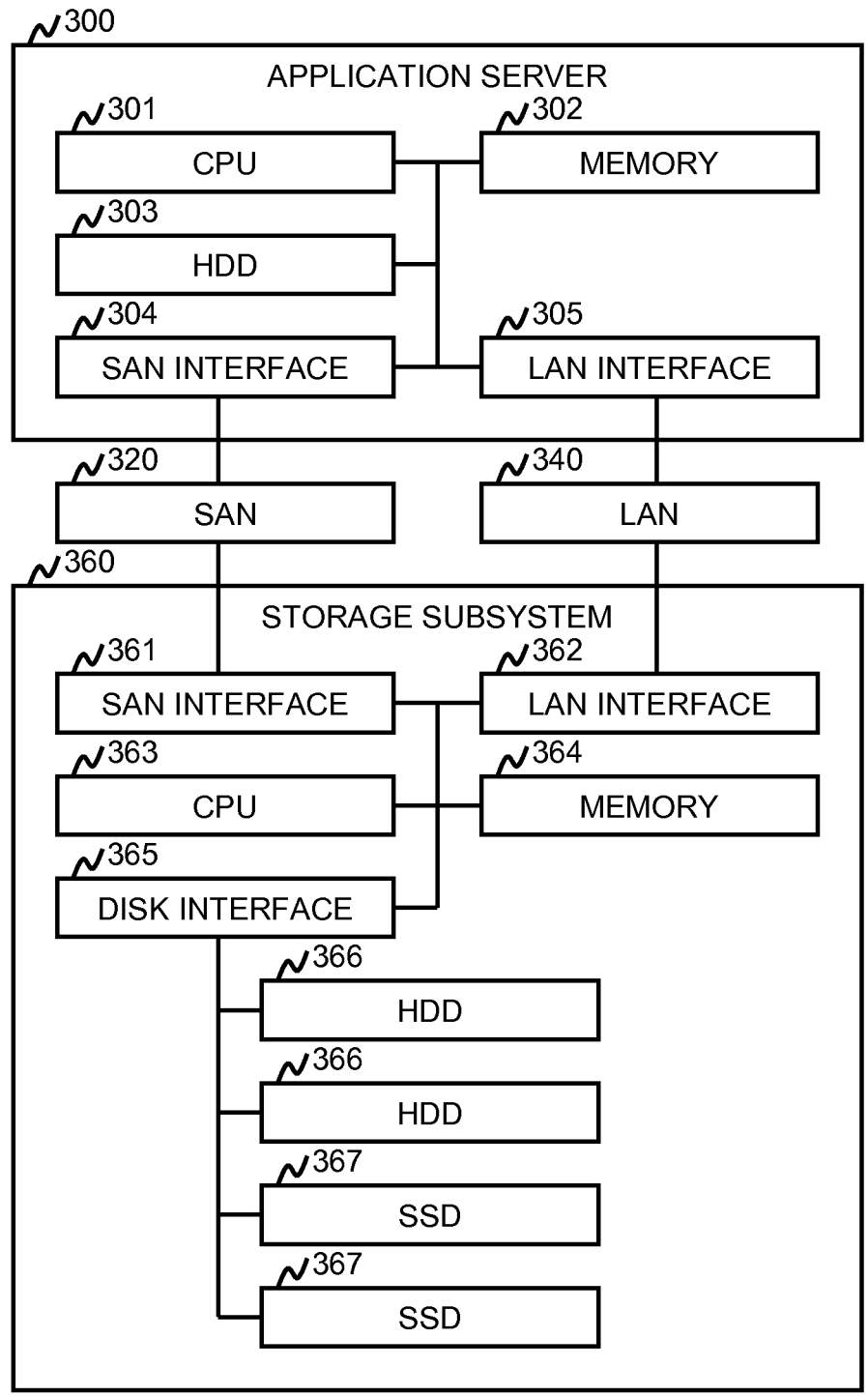
FIG. 3 illustrates a hardware configuration of an information system in accordance with an exemplary embodiment.

FIG. 3 illustrates a hardware configuration of an information system in accordance with an exemplary embodiment. The system includes an application server 300, a SAN (Storage Area Network) 320, a LAN (Local Area Network) 340, and a storage subsystem 360. The application server 300 includes a CPU (Central Processing Unit) 301, a memory 302, a HDD (Hard Disk Drive) 303, a SAN interface 304, and a LAN interface 305. The CPU 301 reads programs from the memory 302 and executes the programs. The memory 302 reads programs and data from the HDD 303 when the application server 300 starts, and stores the programs and the data. The HDD 303 stores programs and data.

The SAN interface 304 connects the application server 300 and the SAN 320. The LAN interface 305 connects the application server 300 and the LAN 340. The SAN 320 connects the application server 300 and the storage subsystem 360. The application server 300 uses the SAN 320 to interact with the storage subsystem 360 to send and receive application data. The application server 300 uses the LAN 340 to interact with the storage subsystem 360 to send and receive management data. The LAN 340 connects the application server 300 and the storage subsystem 360.

The storage subsystem 360 includes a SAN interface 361, a LAN interface 362, a CPU 363, a memory 364, a disk interface 365, one or more HDDs 366, and one or more SSDs (Solid State Drive) 367. The SAN interface 361 connects the storage subsystem 360 and the SAN 320. The LAN interface 362 connects the storage subsystem 360 and the LAN 340. The CPU 363 reads programs from the memory 364 and executes the programs. The memory 364 reads programs and data from the HDD 366 and the SSD 367 when the storage subsystem 360 starts and stores the programs and the data. The disk interface 365 connects the HDDs 366, and the SSDs 367 with the other elements of the storage system 360. The HDDs 366 and SSDs store programs and data.

The memory 302 may be in the form of a computer readable-medium, which can be any medium that participates in providing instructions to CPU 301 for execution. The memory 302 may additionally be a removable storage device, such as a portable hard drive, optical media (CD or DVD), disk media or any other medium from which a computer can read executable code.

Figure 4:
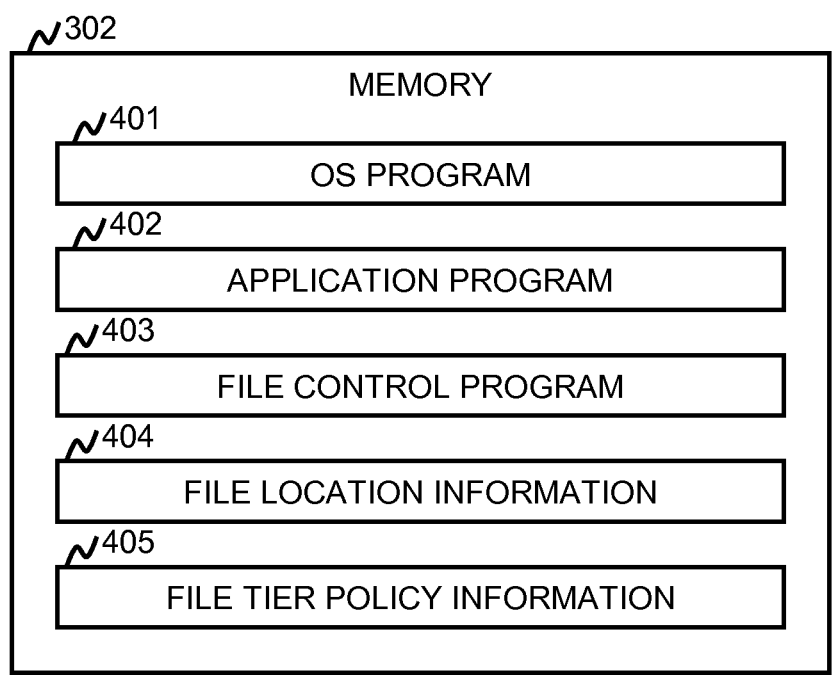
FIG. 4 illustrates a memory in the application server in accordance with an exemplary embodiment.

FIG. 4 illustrates a memory 302 in the application server 300 of FIG. 3 in accordance with an exemplary embodiment. The memory 302 includes an Operating System (OS) program 401, an application program 402, a file control program 403, file location information 404, and file tier policy information 405. The OS program 401 executes the application program 402. The application program 402 (e.g., instructions to control database operations) sends a file read command and a file write command to the file control program 403 to read data from the storage subsystem 360, processes the read data, and writes the results to the storage subsystem 360. The file control program 403 manages files.

When the file control program 403 receives the file read command from the application program 402, the file control program 403 reads data from the storage subsystem 360 and sends the result to the application program 402. When the file control program 403 receives the file write command from the application program 402, the file control program 403 writes the data to the storage subsystem 360 and sends the result to the application program 402.

Figure 5:
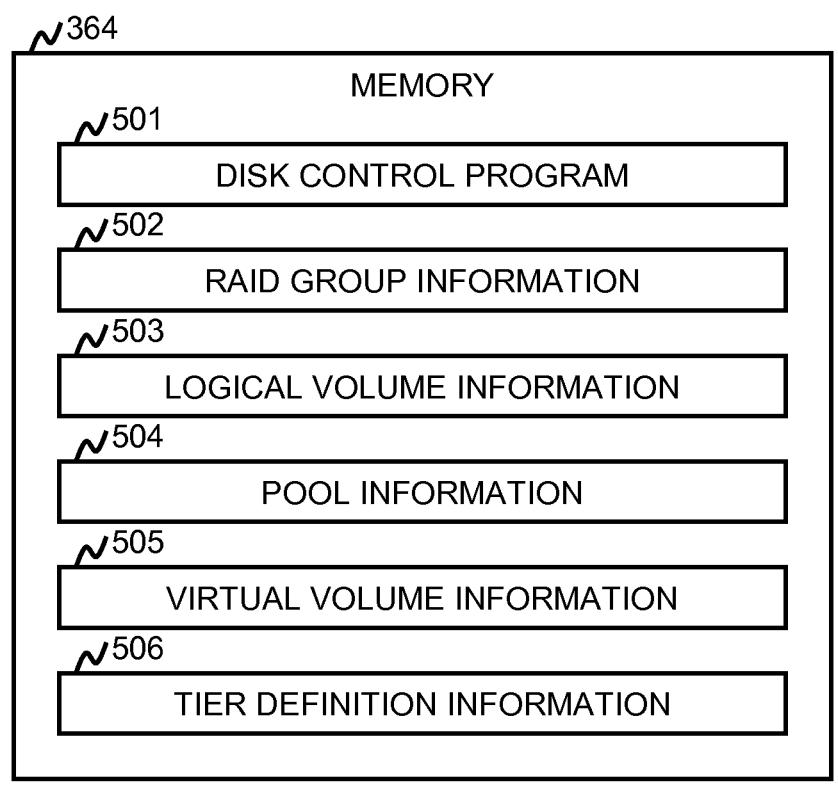
FIG. 5 illustrates a memory in the storage subsystem in accordance with an exemplary embodiments.

FIG. 5 illustrates a memory 364 in the storage subsystem 360 of FIG. 3 in accordance with an exemplary embodiment. The memory 364 includes a disk control program 501, Redundant Array of Inexpensive/Independent Disks (RAID) group information 502, logical volume information 503, pool information 504, virtual volume information 505, and tier definition information 506. The disk control program 501 receives a read command and a write command from the application server 300, reads data from one or more HDDs 366 and one or more SSDs 367, and writes data to one or more HDDs 366 and one or more SSDs 367 using the RAID group information 502, the logical volume information 503, the pool information 504, the virtual volume information 505, and the tier definition information 506.

FIG. 6 illustrates the file location information 404 in accordance with an exemplary embodiment. The file location information 404 includes a table with rows (e.g. 605, 606, 607) for entries for a file name 601, a file address 602, a volume name 603, and a volume address 604. The file location information 404 shows data specified by the file name 601 and the file address 602. This data is stored in an area specified by the volume name 603 and the volume address 604.

FIG. 7 illustrates the file tier policy information 405 in accordance with an exemplary embodiment. The file tier policy information 405 includes a first table with rows (e.g. 703, 704, 705) for entries for a file name 701 and a tier 702. The file tier policy information 405 includes a second table with rows 713, 714 for entries for a volume name 711, and a priority 712. The file tier policy information 405 shows that for the first table, a file specified by the file name 701 should be stored in an area with corresponding tier 702. In the second table, the priority 712 shows which volume name 711 has a higher or lower priority tier, if two or more files are located on one page. An administrator or the application program 402 can edit the file tier policy information 405.

FIG. 8 illustrates the RAID group information 502 in accordance with an exemplary embodiment. The RAID group information 502 includes a table with rows (e.g. 806, 807, 808) for entries for a RAID group name 801, a media name 802, a RAID level 803, a media type 804, and a capacity 805. For example, the row 806 shows that RAID group "RG A" includes media "SSD A," "SSD B," and "SSD C," a RAID level of "RAID 5," media types "SSD SLC," and a capacity of "100."

FIG. 9 illustrates the logical volume information 503 in accordance with an exemplary embodiment. The logical volume information 503 includes a table with rows (e.g. 905, 906, 907) for entries for a logical volume name 901, a logical volume address 902, a RAID group name 903, and a RAID group address 904. For example, row 905 shows that the address from "O " to "99" of "L-VOL A" is mapped to the address from "O" to "99" in RAID group "RGA."

FIG. 10 illustrates the pool information 504 in accordance with an exemplary embodiment. The pool information 504 includes a table with rows (e.g. 1005, 1006), for entries for a pool name 1001, a logical volume name 1002, a virtual volume name 1003, and a capacity 1004. For example, row 1005 shows that pool "POOL A" includes logical volumes "L-VOL A," "L-VOL B," and "L-VOL C," the area of "POOL A" is used by "V-VOL A", and the capacity of "V-VOL A" is "300."

FIG. 11 illustrates the virtual volume information 505 in accordance with an exemplary embodiment. The virtual volume information 505 includes a table with rows (e.g. 1107, 1108, 1109, 1110, 1111) for entries for a virtual volume page number 1101, a virtual volume name 1102, a virtual volume address 1103, a logical volume page number 1104, a logical volume name 1105, and a logical volume address 1106. In the example of FIG. 11, the page size is 10. For example, row 1107 shows that the address of "PAGE O" is from "O" to "9" on "V-VOL A" and the address of "PAGE 100" is from "O" to "9" on "L-VOL A, " and "PAGE O" is mapped to "PAGE 100."

FIG. 12 illustrates the tier definition information 506 in accordance with an exemplary embodiment. The tier definition information 506 includes a table with rows (e.g. 1204, 1205, 1206) for entries for a tier 1201, a media type 1202, and a default tier 1203. For example, the row 1204 shows that the media type of tier "1" is "SSD SLC" and tier "1" is not default tier and the row 1205 shows that the media type of tier "2" is "HDD SAS 15,000 rpm" and tier "2" is default tier.

Figure 13:
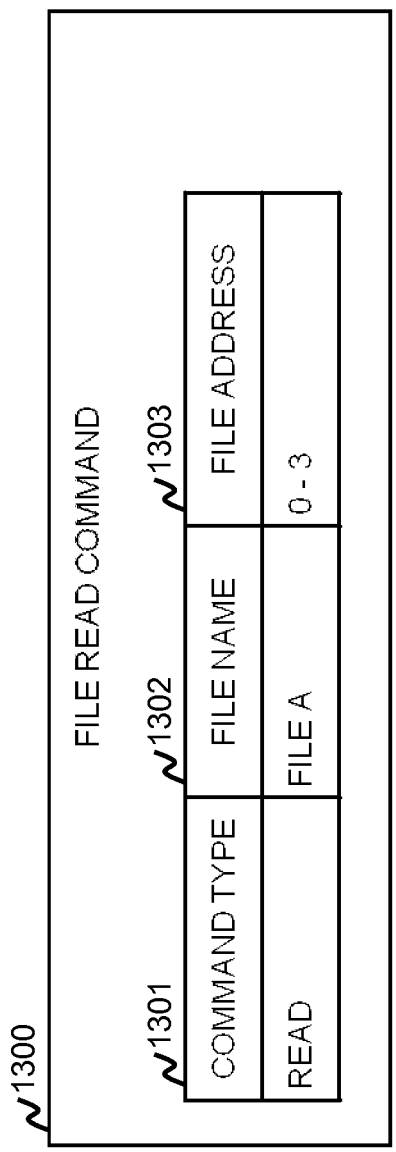
FIG. 13 illustrates the tier definition information in the form of a table in accordance with an exemplary embodiment.

FIG. 13 illustrates a file read command 1300 in accordance with an exemplary embodiment. The file read command 1300 includes a command type 1301, a file name 1302, and a file address 1303. The file read command 1300 is sent from the application program 402 to the file control program 403.

FIG. 14 illustrates a file write command 1400 in accordance with an exemplary embodiment. The write command 1400 includes a command type 1401, a file name 1402, a file address 1403, and data 1404. The file write command 1600 is sent from the application program 402 to the file control program 403.

Figure 15:
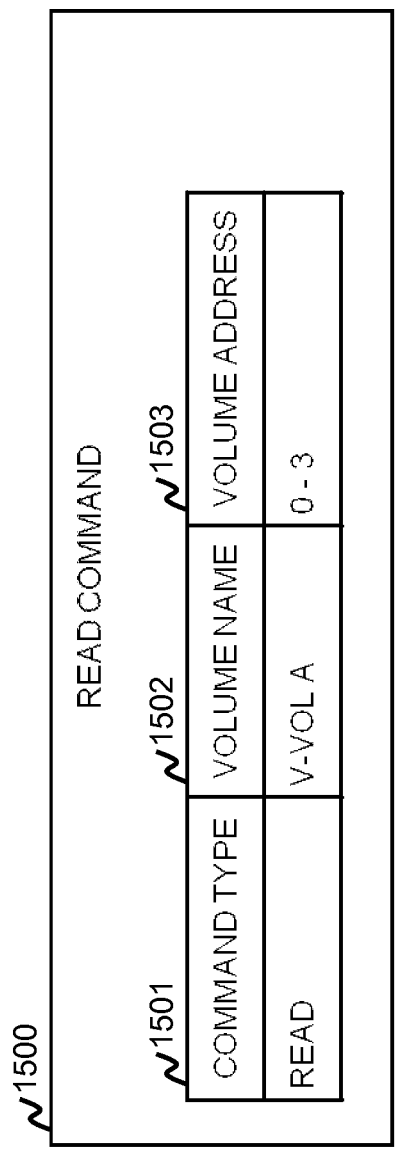
FIG. 15 illustrates a read command in accordance with an exemplary embodiment.

FIG. 15 illustrates a read command 1500 in accordance with an exemplary embodiment. The read command 1500 includes a command type 1501, a volume name 1502, and a volume address 1503. The read command 1500 is sent from the file control program 403 to the storage subsystem 360.

Figure 16:
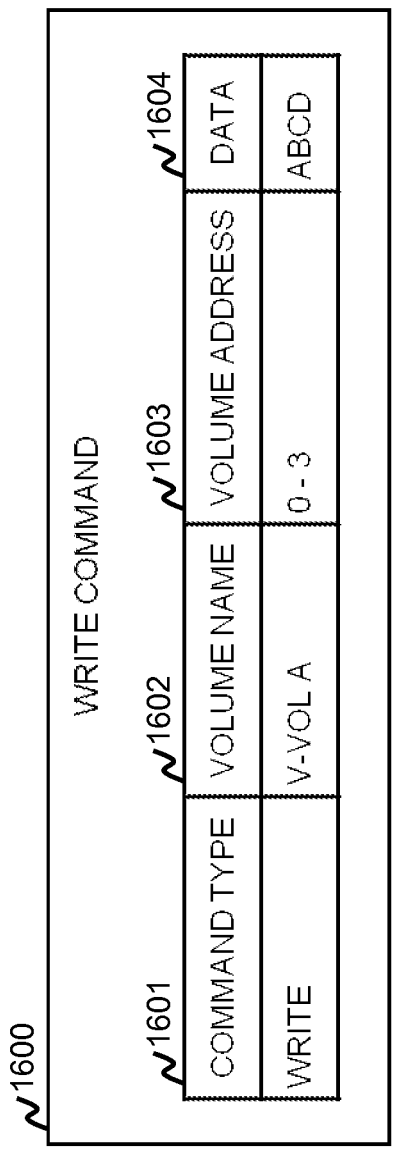
FIG. 16 illustrates a write command in accordance with an exemplary embodiment.

FIG. 16 illustrates a write command 1600 in accordance with an exemplary embodiment. The write command 1600 includes a command type 1601, a volume name 1602, a volume address 1603, and data 1604. The write command 1600 is sent from the file control program 403 to the storage subsystem 360.

Figure 17:
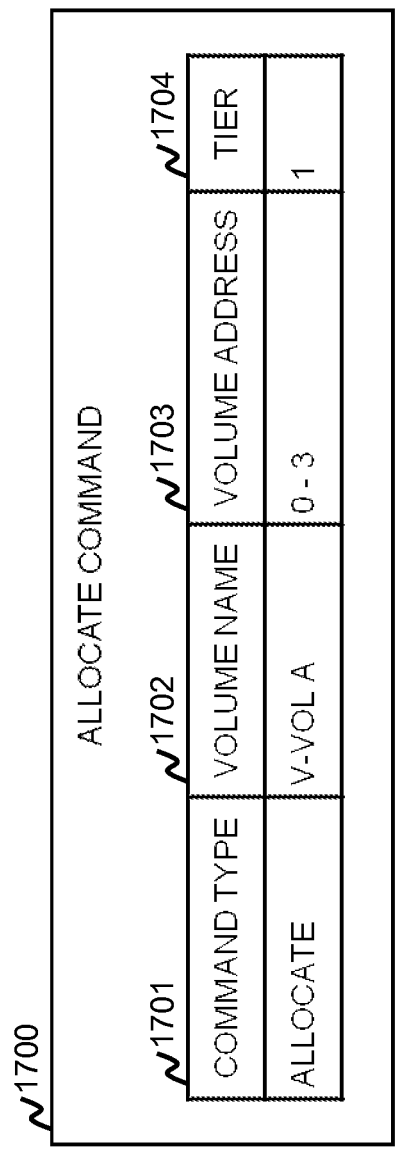
FIG. 17 illustrates an allocate command in accordance with an exemplary embodiment.

FIG. 17 illustrates an allocate command 1700 in accordance with an exemplary embodiment. The allocate command 1700 includes a command type 1701, a volume name 1702, a volume address 1703, and a tier 1704. The allocate command 1700 is sent from the file control program 403 to the storage subsystem 360.

First Exemplary Implementation

In the first exemplary implementation, the application program sends a command to change the tier of a specified storage area. If the specified storage area is a part of a page, and if the tier specified by the command is lower than the tier currently allocated to the specified area, then the storage subsystem does not change the tier. If the tier specified by the command is not lower than the tier currently allocated to the specified area, then the storage subsystem changes the tier of the specified storage area based on the command. References will be made to elements from previous figures for clarity purposes.

Figure 18:
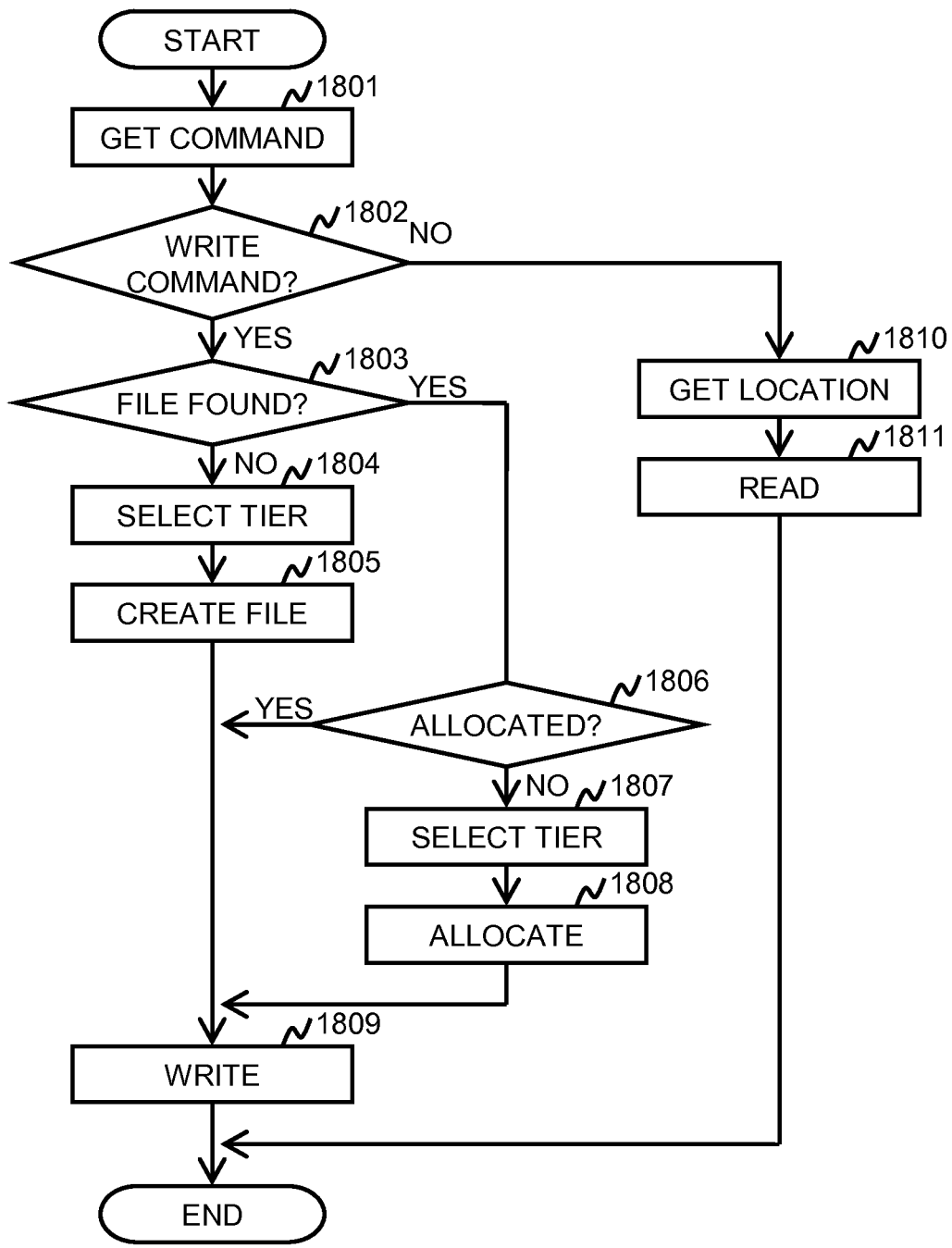
FIG. 18 illustrates a flow diagram of the file control program in accordance with the first exemplary implementation.

The file control program 403 receives the file read command 1300 or the file write command 1400 from the application program 402, sends the read command 1500 or the write command 1600 to the storage subsystem 360, and sends the result of read or write to the application program 402. FIG. 18 illustrates a flow diagram of the file control program 403 in application server 300 when a file read command 1300 or file write command 1400 is received, in accordance with the first exemplary implementation.

In operation 1801, the file control program 403 receives the file read command 1300 or the file write command 1400 from the application program 402. In operation 1802, if the received command from operation 1801 is the file write command 1400, then the process goes to operation 1803 as explained below; if not, then the process goes to operation 1810 as explained below.

In operation 1803, if the file name specified by the file name 1402 in the file write command 1400 is listed in the file name 601 in the file location information 404, then the process goes to operation 1806; if not, then the process goes to operation 1804. In operation 1804, the file control program 403 gets the tier 702 from the file tier policy information 405 specified by the file name 1402 in the file write command 1400. In operation 1805, the file control program 403 searches for an unallocated area for any file from the file location information 404, sends the allocate command 1700 indicating a volume address 1703 corresponding to an unallocated area and a tier 1704 corresponding the tier selected in operation 1804 to the storage subsystem 360, and updates the file location information 404.

In operation 1806, if the area specified by the volume address 1403 in the file write command 1400 is allocated in the file address 602 in the file location information 404, then the process goes to operation 1809; if not, then the process goes to operation 1807. In operation 1807, the file control program 403 gets the tier 702 from the file tier policy information 405 specified by the file name 1402 in the file write command 1400. In operation 1808, the file control program 403 searches for an unallocated area for any file from the file location information 404, sends the allocate command 1700 indicating a volume address 1703 corresponding to an unallocated area and the tier 1704 corresponding to the tier selected in operation 1807 to the storage subsystem 360, and updates the file location information 404.

In operation 1809, the file control program 403 sends the write command 1600 that the volume address 1603 is specified by the file write command 1400 and the file location information 404 to the storage subsystem 360 and sends the result of the write to the application program 402.

In operation 1810, the file control program 403 gets the volume name 603 and the volume address 604 that the file name 601 and the file address 602 are specified by the file name 1302 and the file address 1303 in the file read command 1300. In operation 1811, the file control program 403 sends the read command 1500 that the volume name 1502 and the volume address 1503 are the volume name 603 and the volume address 604 gotten in operation 1810.

Figure 19:
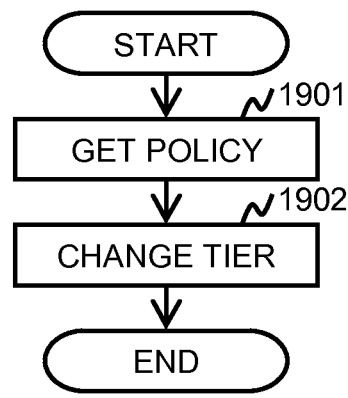
FIG. 19 illustrates another example of a flow diagram of the file control program in accordance with the first exemplary implementation.

FIG. 19 illustrates an exemplary flow diagram for the file control program 403 in application server 300 for changing the tier when the file tier policy information 405 is modified in accordance with the first exemplary implementation.

The file control program 403 changes the tier for a file a different tier when the file tier policy information 405 is changed. The application program 402 and an administrator can modify the file tier policy information 405.

In operation 1901, the file control program 403 gets the file tier policy information 405 when the application program 402 or the administrator modifies the file tier policy information 405. In operation 1902, the file control program 403 sends the allocate command 1700 to the storage subsystem 360 to change a tier to the tier specified by the file tier policy information 405 received in operation 1901.

Figure 20:
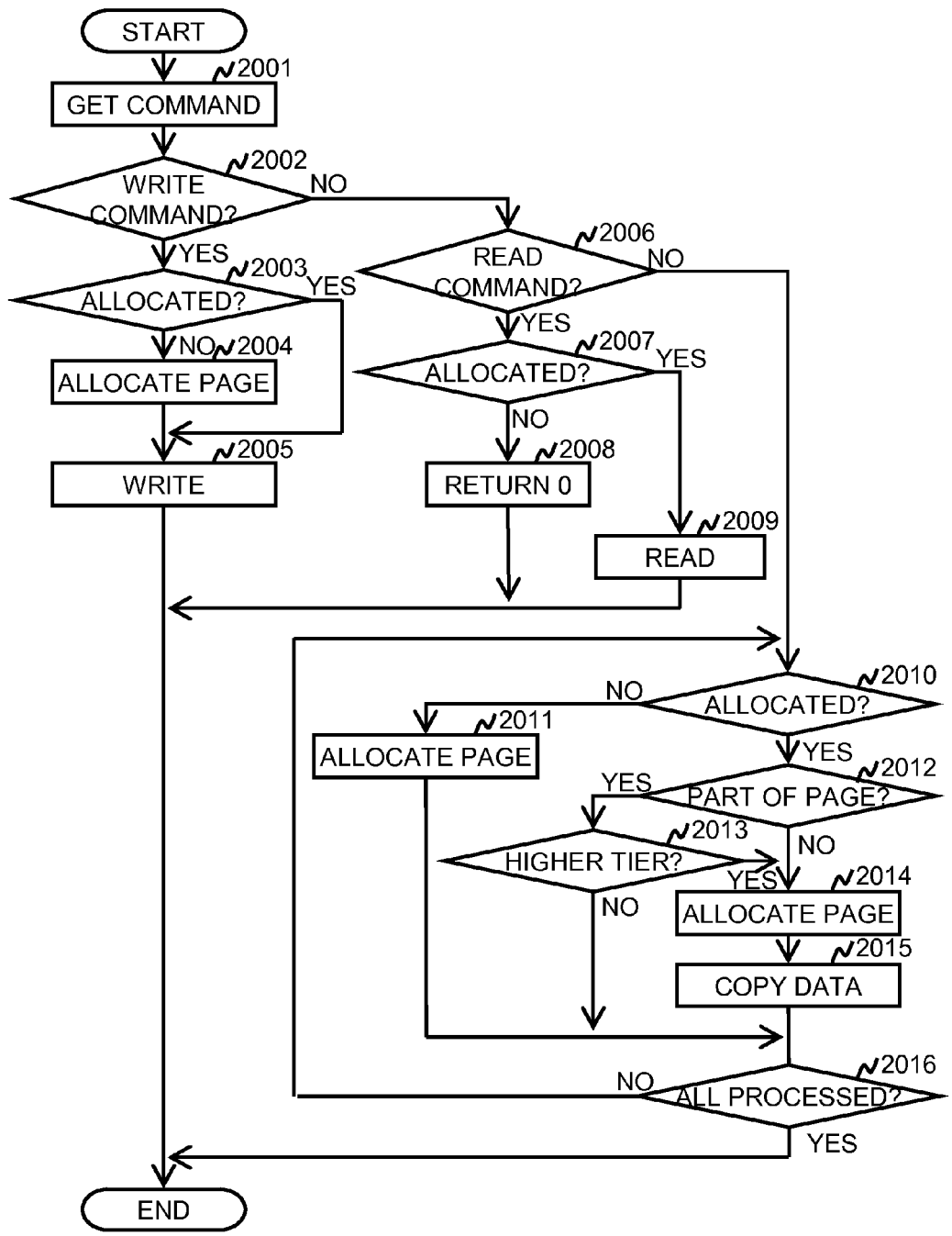
FIG. 20 illustrates a flow diagram of the disk control program in accordance with the first exemplary implementation.

FIG. 20 illustrates an exemplary flow diagram for disk control program 501 for the storage subsystem 360 in accordance with the first exemplary implementation.

The disk control program 501 receives the read command 1500, the write command 1600, or the allocate command 1700 from the file control program 403, and the disk control program 501 sends the result of the read or write command.

In operation 2001, the disk control program 501 receives the read command 1500, the write command 1600, or the allocate command 1700 from the file control program 403. In operation 2002, if the command that the disk control program 501 received in operation 1401 is the write command 1600, then the process goes to operation 2003; if not, then the process goes to operation 2006.

In operation 2003, if an area specified by the volume name 1602 and the volume address 1603 of the write command 1600 is allocated in the virtual volume information 505, then the process goes to operation 2005; if not, then the process goes to operation 2004. In operation 2004, the disk control program 501 allocates an unallocated area of a logical volume that media type is specified by the default tier 1203 in the tier definition information 506 to the virtual volume specified by the volume name 1602 and the volume address 1603, and updates the virtual volume information 505. In operation 2005, the disk control program 501 gets the volume name 1602 and the volume address 1603 from the write command 1600, gets the logical volume name 1105 and the logical volume address 1106 from the virtual volume information 505, gets the RAID group name 903 and the RAID group address 904 from the logical volume information 503, and writes the data 1604 of the write command 1600 to an area specified by the RAID group name 903 and the RAID group address 904.

In operation 2006, if the command that the disk control program 501 received in operation 2001 is the read command 1500, then the process goes to operation 2007; if not, then the process goes to operation 2010.

In operation 2007, if an area specified by the volume name 1502 and the volume address 1503 of the read command 1500 is allocated in the virtual volume information 505, then the process goes to operation 2009; if not, then the process goes to operation 2008. In operation 2008, the disk control program 501 returns "O" to the application server 300 because the area specified by the volume name 1502 and the volume address 1503 is not written. In operation 2009, the disk control program 501 gets the volume name 1502 and the volume address 1503 from the read command 1500, gets the logical volume name 1105 and the logical volume address 1106 from the virtual volume information 505, gets the RAID group name 903 and the RAID group address 904 from the logical volume information 503, reads an area specified by the RAID group name 903 and the RAID group address 904, and returns the data.

In operation 2010, if the page including the area specified by the volume name 1702 and the volume address 1703 in the allocate command 1700 is allocated in the virtual volume information 505, then the process goes to operation 2012; if not, then the process goes to operation 2011.

In operation 2011, the disk control program 501 searches an unallocated area that the size is the same as the page size and the tier is specified by the tier 1704 in the allocate command 1700 from the virtual volume information 505 and the logical volume information 503, allocates the page to the area including the area specified by the volume name 1702 and the volume address 1703 in the allocate command 1700, and updates the virtual volume information 505. The disk control program 501 may reserve the area of the tier specified by the tier 1704 to allocate and allocate the area of the tier specified by the tier 1704 when the disk control program 501 receives the write command 1600 to the area in operation 2004.

In operation 2012, if the area specified by the volume name 1702 and the volume address 1703 in the allocated command 1700 is a part of a page, then the process goes to operation 2013; if not, then the process goes to operation 2014.

In operation 2013, the disk control program 501 compares the specified volume name 1702 to the volume names 711 in the file tier policy information, and checks the corresponding priority 712 of the specified volume name 1702. If the priority 712 is "HIGHER TIER" and the specified tier 1704 is higher than the tier of the page with the address specified by the volume name 1702 and the volume address 1703 in the allocate command 1700, then the process goes to operation 2014. If the priority 712 is "LOWER TIER" and the specified tier 1704 is lower than the tier of the page including the address specified by the volume name 1702 and the volume address 1703 in the allocate command 1700, then the process goes to operation 2014; if not, then the process ends.

In operation 2013, if the specified tier 1704 is higher than the tier of the page with the address specified by the volume name 1702 and the volume address 1703 in the allocate command 1700, then the process goes to operation 2014; if not, then the process ends.

In operation 2014, the disk control program 501 searches for an unallocated area with the same page size, and with the same tier as specified by the tier 1704 in the allocate command 1700 from the virtual volume information 505 and the logical volume information 503, and allocates the found page to the area specified by the volume name 1702 and the volume address 1703 in the allocate command 1700. In operation 2015, the disk control program 501 copies the data stored in the page including the area specified by the volume name 1702 and the volume address 1703 in the allocated command 1700 to the page allocated in operation 2013 and updates the virtual volume information 505. In operation 2016, if all of the pages with the area specified by the volume name 1702 and the volume address 1703 are processed, then the process ends; if not, then the process goes to operation 2010.

Second Exemplary Implementation

In the second exemplary implementation, the storage system is set up such that each page only stores a single file. In the first exemplary implementation, at least one file is stored in each page, allowing for the possibility of multiple files being stored in a page. References will be made to elements from previous figures and previously described elements of the first exemplary implementation will be omitted below for clarity purposes.

Figure 21:
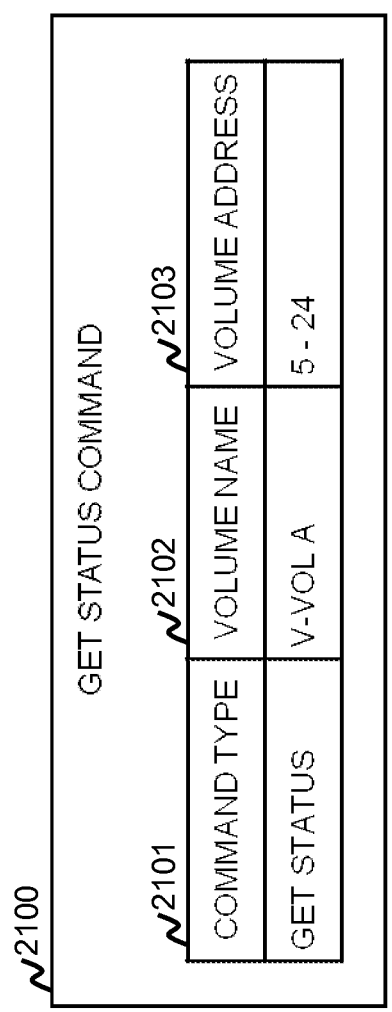
FIG. 21 illustrates a get status command in accordance with the second exemplary implementation.

FIG. 21 illustrates a get status command 2100 in accordance with the second exemplary implementation. The get status command 2100 includes a command type 2101, a volume name 2102, and a volume address 2103. The get status command 2100 is sent from the file control program 403 to the storage subsystem 360 when the file control program 403 is started.

FIG. 22 illustrates a get status command reply 2200 in accordance with the second exemplary implementation. The get status command reply 2200 includes a reply type 2201, a volume name 2202, a volume address 2203, an allocated tier 2204, page size 2205, and a number of tiers 2206. The get status command reply 2200 is sent from the storage subsystem 360 to the file control program 403 as a reply of the get status command 2100. The allocated tier 2204 shows the tier allocated to the area specified by the volume name 2202 and the volume address 2203. If the area specified by the volume name 2202 and the volume address 2203 is not allocated, then "Not Allocated" is returned. The page size 2205 shows the size of page in the volume specified by the volume name 2203. The number of tiers 2206 shows the number of tiers in the volume specified by the volume name 2203.

Figure 23:
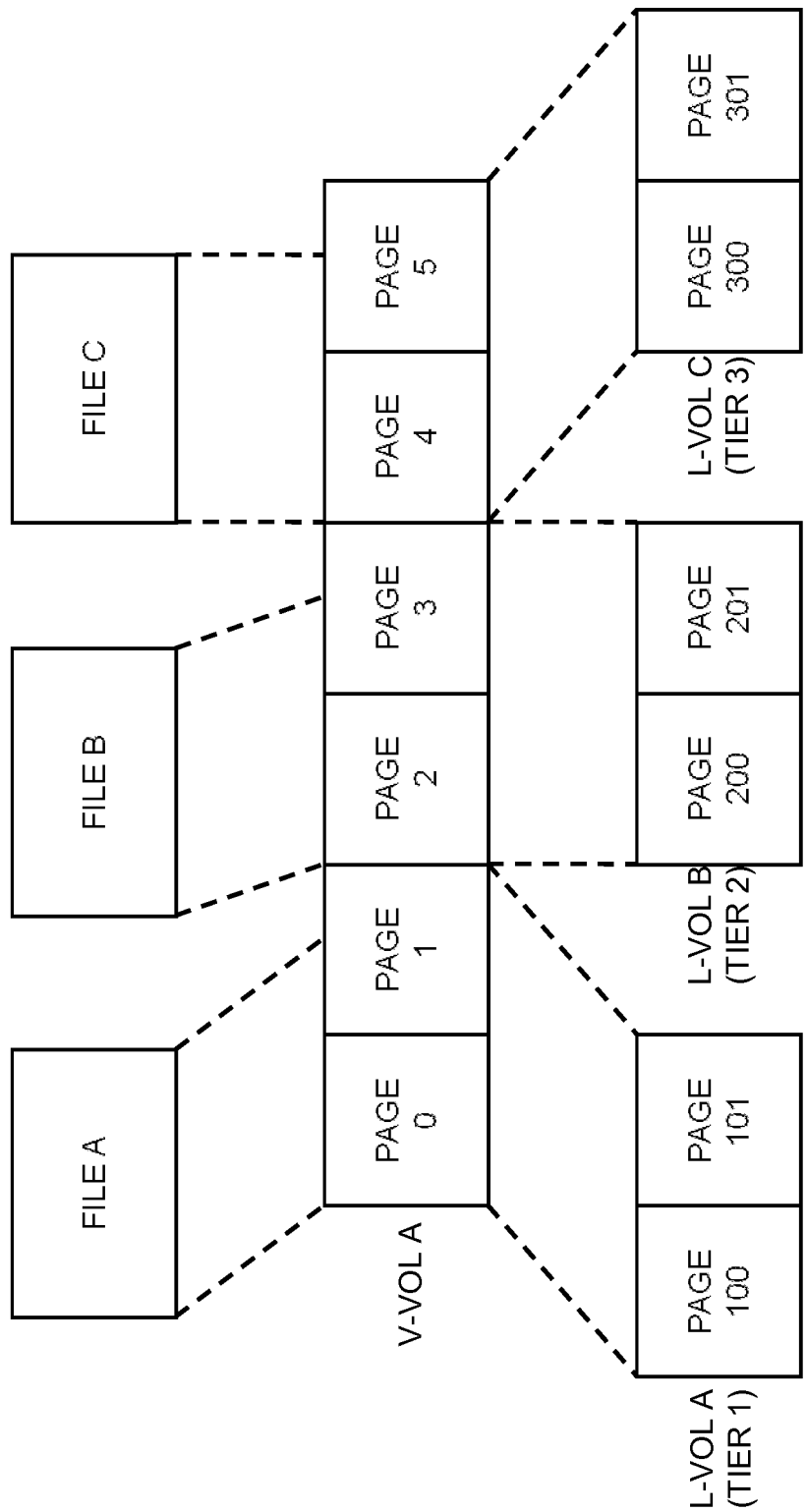
FIG. 23 illustrates a diagram illustrating relationships between files, virtual volumes, and logical volumes in the virtual volume information in accordance with the second exemplary implementation.

FIG. 23 illustrates a diagram illustrating relationships between files, virtual volumes, and logical volumes in the virtual volume information 505 in accordance with the second exemplary implementation. Only one file is allocated for each page in the second exemplary implementation, because the file control program is informed of the page boundaries based on the page size 2205 in the get status command reply 2200.

Figure 24:
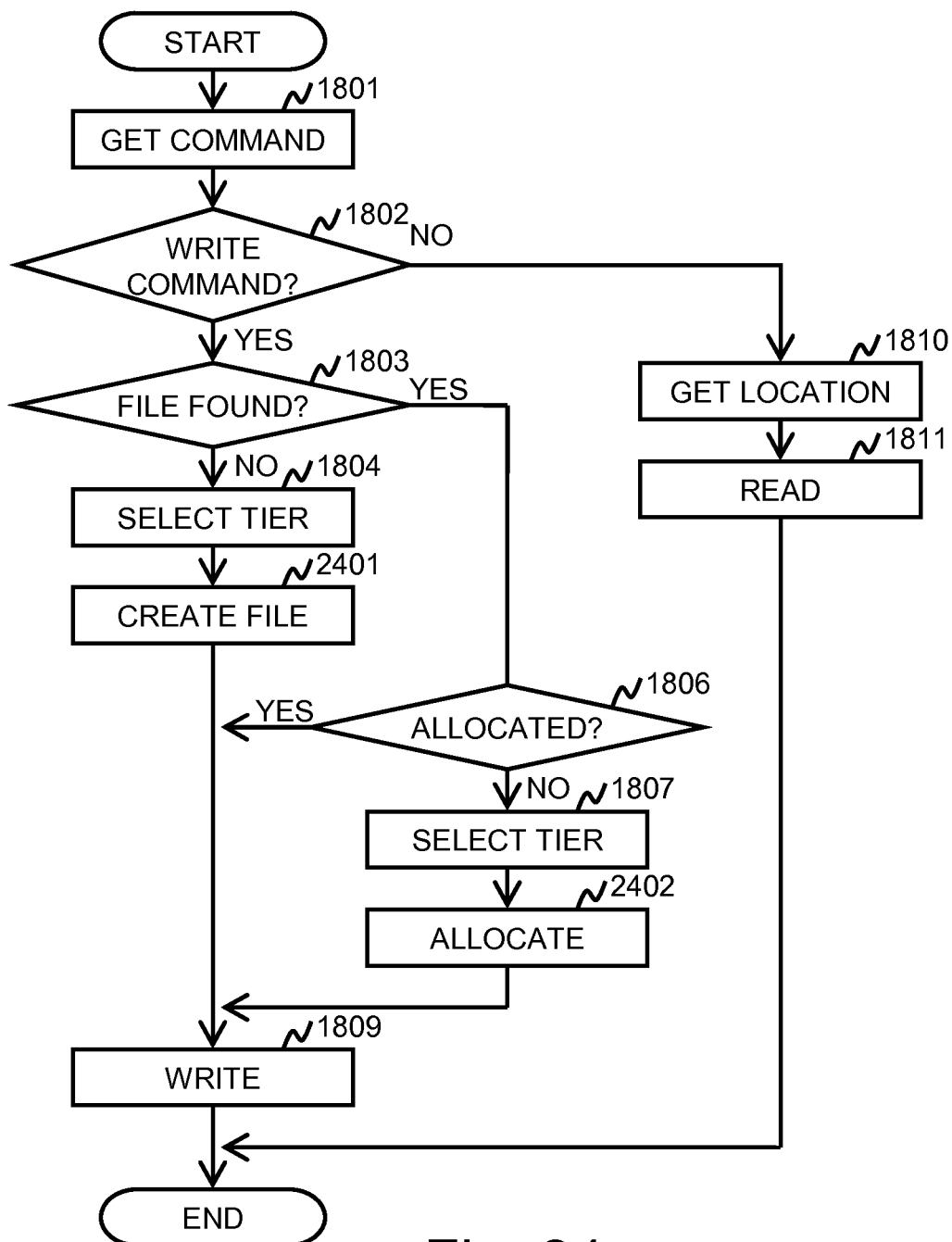
FIG. 24 illustrates another example of a flow diagram of the file control program in accordance with the second exemplary implementation.

FIG. 24 illustrates an exemplary flow diagram for the file control program 403 in accordance with the second exemplary implementation. The file control program 403 receives the file read command 1300 or the file write command 1400 from the application program 402, sends the read command 1500 or the write command 1600 to the storage subsystem 360, and sends the result of read or write to the application program 402.

Operation 2401 is similar to operation 1805 of the first exemplary implementation. However, in operation 2401, only one file is allocated to each page. In operation 1805, one or more files can be allocated on each page.

Operation 2402 is similar to operation 1808 of the first exemplary implementation. However, in operation 2402, only one file is allocated on each page. In operation 1808, one or more files can be allocated on each page.

Figure 25:
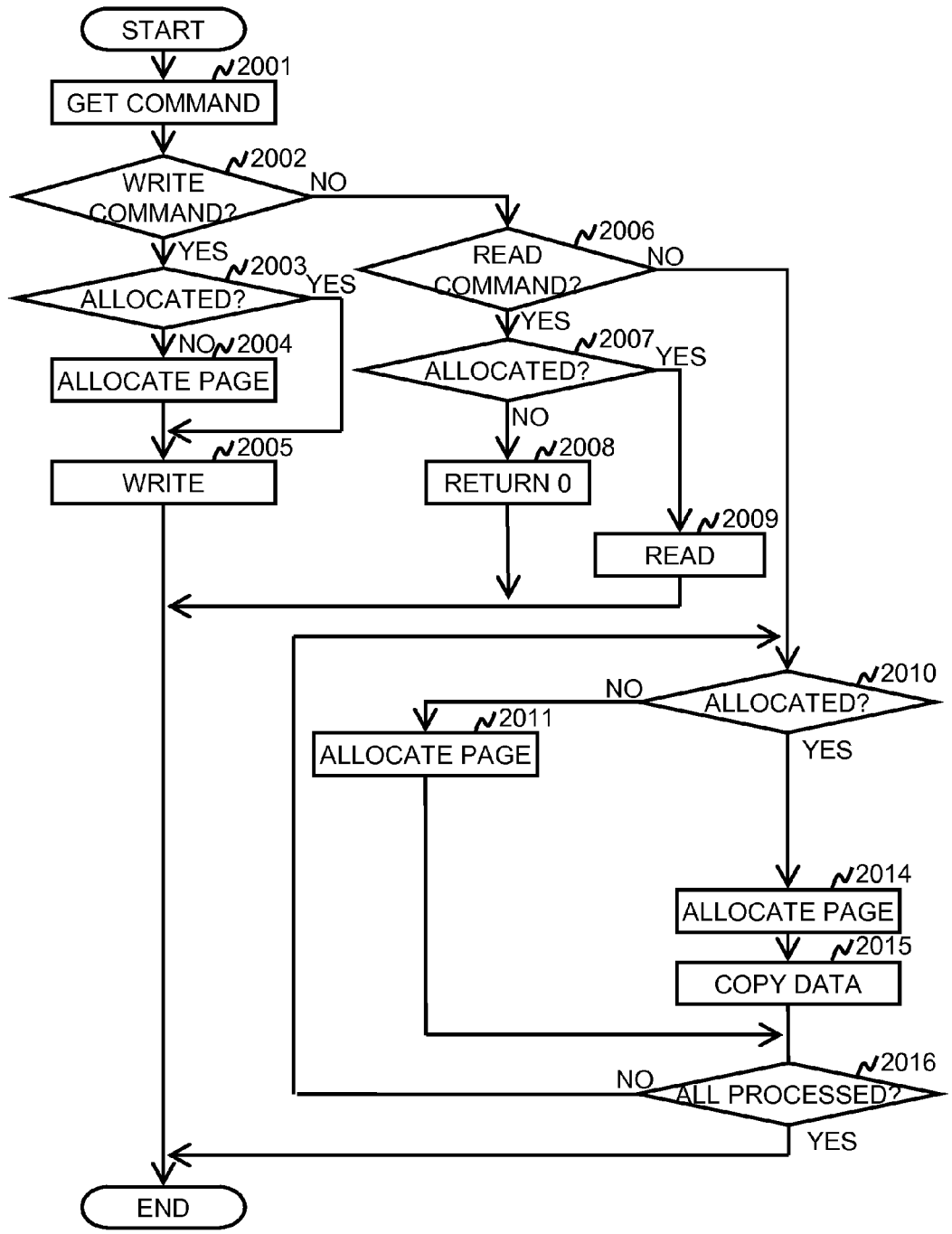
FIG. 25 illustrates a flow diagram of the disk control program in accordance with the second exemplary implementation.

FIG. 25 illustrates an exemplary flow diagram for the disk control program 501 in accordance with the second exemplary implementation. In the second exemplary implementation, operation 2012 and operation 2013 are omitted because only one page is allocated on each page. The disk control program 501 receives the read command 1500, the write command 1600, or the allocate command 1700 from the file control program 403, and the disk control program 501 sends the result of read or write command.

Moreover, other implementations of the invention will be apparent to those skilled in the art from consideration of the specification and practice of the invention disclosed herein. Various aspects and/or components of the described embodiments may be used singly or in any combination in the computerized storage system permitting the change of tiers to a storage area. It is intended that the specification and examples be considered as exemplary only, with a true scope and spirit of the invention being indicated by the following claims.

What is claimed is:

1. A system comprising:
a storage subsystem comprising:
a plurality of storage devices configured to provide a plurality of pages having a plurality of tiers; and
a central processing unit (CPU) configured to provide a virtual volume to which one or more pages of the plurality of pages are allocated, wherein the virtual volume comprises a first storage area to which at least a part of a certain page of the plurality of pages is allocated, the certain page having a first tier;
for the CPU receiving a command for changing a tier of the first storage area in the virtual volume to a second tier, the CPU is configured to determine whether the first tier of the certain page allocated to the first storage area is different from the second tier indicated in the command,
for the first tier of the first page allocated to the first storage area being different from the second tier, the CPU is configured to execute the command by:
allocating a new page having the second tier instead of the certain page; and
copying data in the certain page to the allocated new page;
for the first tier of the certain page allocated to the first storage area not being different from the second tier, the CPU is configured to not execute the command.

2. The system of claim 1, wherein for the CPU receiving a command for changing a tier of the first storage area in the virtual volume to a second tier, the CPU is configured to determine whether another part of the certain page is not allocated to the first storage area,
wherein for the first tier of the certain page allocated to the first storage area being different from the second tier and for the another part of the certain page not being allocated to the first storage area, the CPU is configured to execute the command.

3. The system of claim 1, further comprising an application server sending the command for changing the tier of the first storage area in the virtual volume to the storage subsystem;
wherein when the storage subsystem receives a status inquiry command for a location in the storage subsystem from the application server, the storage subsystem transmits to the application server allocated tier information corresponding to the location.

4. The system of claim 3, wherein when the application server receives the allocated tier information corresponding to the location, the application server determines an area in the storage location that aligns a file to be stored in the storage system to the page.

5. The system of claim 1, wherein the storage subsystem comprises storage volumes, and wherein the first storage area is specified by a storage volume identification and storage address for one of the storage volumes.

6. A non-transitory computer readable medium storing instructions for executing a process for a storage subsystem, the instructions comprising:
> providing, from a plurality of storage devices, a plurality of pages having a plurality of tiers;
> providing a virtual volume to which one or more pages of the plurality of pages are allocated, wherein the virtual volume comprises a first storage area to which at least a part of a certain page of the plurality of pages is allocated, the certain page having a first tier;
> for receipt of a command for changing a tier of the first storage area in the virtual volume to a second tier, determining whether the first tier of the certain page allocated to the first storage area is different from the second tier indicated in the command,
> for the first tier of the first page allocated to the first storage area being different from the second tier, executing the command by:
> allocating a new page having the second tier instead of the certain page; and
> copying data in the certain page to the allocated new page;
> for the first tier of the certain page allocated to the first storage area not being different from the second tier, not executing the command.

7. The non-transitory computer readable medium of claim 6, the instructions further comprising, for receipt of a command for changing a tier of the first storage area in the virtual volume to a second tier, determining whether another part of the certain page is not allocated to the first storage area,
> wherein for the first tier of the certain page allocated to the first storage area being different from the second tier and for the another part of the certain page not being allocated to the first storage area, not executing the command.

8. The non-transitory computer readable medium of claim 6, the instructions further comprising receiving the command for changing the tier of the first storage area in the virtual volume to the storage subsystem from the application server;
> wherein upon receipt of a status inquiry command for a location in the storage subsystem from the application server, the storage subsystem transmits to the application server allocated tier information corresponding to the location.

9. The non-transitory computer readable medium of claim 8, wherein when the application server receives the allocated tier information corresponding to the location, the application server determines an area in the storage location that aligns a file to be stored in the storage system to the page.

10. The non-transitory computer readable medium of claim 6, wherein the storage subsystem comprises storage volumes, and wherein the first storage area is specified by a storage volume identification and storage address for one of the storage volumes.

11. A method for a storage subsystem, the method comprising:
> providing, from a plurality of storage devices, a plurality of pages having a plurality of tiers;
> providing a virtual volume to which one or more pages of the plurality of pages are allocated, wherein the virtual volume comprises a first storage area to which at least a part of a certain page of the plurality of pages is allocated, the certain page having a first tier;
> for receipt of a command for changing a tier of the first storage area in the virtual volume to a second tier, determining whether the first tier of the certain page allocated to the first storage area is different from the second tier indicated in the command,
> for the first tier of the first page allocated to the first storage area being different from the second tier, executing the command by:
> allocating a new page having the second tier instead of the certain page; and
> copying data in the certain page to the allocated new page;
> for the first tier of the certain page allocated to the first storage area not being different from the second tier, not executing the command.

12. The method of claim 11, further comprising, for receipt of a command for changing a tier of the first storage area in the virtual volume to a second tier, determining whether another part of the certain page is not allocated to the first storage area,
> wherein for the first tier of the certain page allocated to the first storage area being different from the second tier and for the another part of the certain page not being allocated to the first storage area, not executing the command.

13. The method of claim 11, further comprising receiving the command for changing the tier of the first storage area in the virtual volume to the storage subsystem from the application server;
> wherein upon receipt of a status inquiry command for a location in the storage subsystem from the application server, the storage subsystem transmits to the application server allocated tier information corresponding to the location.

14. The method of claim 13, wherein when the application server receives the allocated tier information corresponding to the location, the application server determines an area in the storage location that aligns a file to be stored in the storage system to the page.

15. The method of claim 11, wherein the storage subsystem comprises storage volumes, and wherein the first storage area is specified by a storage volume identification and storage address for one of the storage volumes.

* * * * *